United States Patent
Kadgi et al.

(10) Patent No.: US 9,733,939 B2
(45) Date of Patent: Aug. 15, 2017

(54) PHYSICAL REFERENCE LIST FOR TRACKING PHYSICAL REGISTER SHARING

(71) Applicant: Intel Corporation, Santa Clara, CA (US)

(72) Inventors: Vijaykumar Balaram Kadgi, Portland, OR (US); James D. Hadley, Portland, OR (US); Avinash Sodani, Portland, OR (US); Matthew C. Merten, Hillsboro, OR (US); Morris Marden, Hillsboro, OR (US); Joseph A. McMahon, Portland, OR (US); Grace C. Lee, Portland, OR (US); Laura A. Knauth, Portland, OR (US); Robert S. Chappell, Portland, OR (US); Fariborz Tabesh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1160 days.

(21) Appl. No.: 13/631,664

(22) Filed: Sep. 28, 2012

(65) Prior Publication Data
US 2014/0095838 A1    Apr. 3, 2014

(51) Int. Cl.
*G06F 9/38* (2006.01)
*G06F 9/30* (2006.01)

(52) U.S. Cl.
CPC .......... *G06F 9/30105* (2013.01); *G06F 9/384* (2013.01)

(58) Field of Classification Search
CPC ..................................................... G06F 9/384
See application file for complete search history.

(56) References Cited

U.S. PATENT DOCUMENTS

| 6,137,707 | A  | * | 10/2000 | Srinivasan | G11C 15/04 365/189.07 |
|---|---|---|---|---|---|
| 6,594,754 | B1 | * | 7/2003 | Jourdan | G06F 9/30167 712/216 |
| 2004/0015904 | A1 | * | 1/2004 | Jourdan | G06F 9/3838 717/141 |
| 2008/0016324 | A1 | * | 1/2008 | Burky | G06F 9/3838 712/217 |
| 2009/0077308 | A1 | * | 3/2009 | Yu | G11C 15/00 711/108 |
| 2009/0228692 | A1 | * | 9/2009 | Barrick | G06F 9/384 712/225 |
| 2010/0328981 | A1 | * | 12/2010 | Deshpande | G11C 15/04 365/49.17 |

(Continued)

OTHER PUBLICATIONS

Stack Overflow How to count the frequency of elements in a list, Jan. 29 2010, 6 pages, [retreived from the internet on Aug. 26, 2015], retrieved from URL <stackoverflow.com/questions/2161752/how-to-count-the-frequency-of-the-elements-in-a-list>.*

*Primary Examiner* — Andrew Caldwell
*Assistant Examiner* — Jyoti Mehta
(74) *Attorney, Agent, or Firm* — Patent Capital Group (57) ABSTRACT

A processor includes a processing unit including a storage module having stored thereon a physical reference list for storing identifications of physical registers that have been referenced by multiple logical registers, and a reclamation module for reclaiming physical registers to a free list based on a count of each of the physical registers on the physical reference list.

22 Claims, 8 Drawing Sheets

(56) References Cited

U.S. PATENT DOCUMENTS

| | | | |
|---|---|---|---|
| 2011/0208918 A1* | 8/2011 | Raikin | G06F 12/0862 711/137 |
| 2012/0265969 A1* | 10/2012 | Alexander | G06F 9/30098 712/220 |
| 2013/0275720 A1* | 10/2013 | Keller | G06F 9/30 712/205 |

* cited by examiner

Block A

| marbles id | pdst | valid | A early CAM | | prev cyc final CAM | A final CAM | final valid | action |
|---|---|---|---|---|---|---|---|---|
| 10  0 |  | 1 | HIT | | miss | HIT | 0 | dealloc |
| 10  1 | 10 | 0 | miss | | miss | miss | 0 | |
| 20  2 |  | 1 | HIT | | miss | HIT | 0 | dealloc |
| 30  3 | 10 | 0 | miss | | miss | miss | 0 | |
|     4 |  | 0 | miss | | miss | miss | 0 | |
|     5 | 10 | 1 | miss | | miss | miss | 1 | |
|     6 |  | 0 | miss | | miss | miss | 0 | |
|     7 |  | 0 | miss | | miss | miss | 0 | |

Block B

| marbles id | pdst | valid | B early CAM | | prev cyc final CAM | B final CAM | final valid | action |
|---|---|---|---|---|---|---|---|---|
| 10  0 |  | 1 | miss | | HIT | miss | 0 | free 10 |
| 40  1 | 10 | 0 | miss | | miss | miss | 0 | |
| 50  2 |  | 1 | HIT | | HIT | (masked) | 0 | |
| 10  3 | 10 | 0 | miss | | miss | miss | 0 | |
|     4 |  | 0 | miss | | miss | HIT | 0 | dealloc |
|     5 | 10 | 1 | HIT | | miss | miss | 0 | |
|     6 |  | 0 | miss | | miss | miss | 0 | |
|     7 |  | 0 | miss | | miss | miss | 0 | | cycle 1 → cycle 2: free 20, 30
cycle 2 → cycle 3: +free 40, 50

PHYSICAL REFERENCE LIST FOR TRACKING PHYSICAL REGISTER SHARING

FIELD OF THE INVENTION

The present disclosure pertains to managing registers that reside inside central processing units (CPUs), in particular, to systems and methods for using physical reference list for efficiently tracking the physical registers which are shared by multiple logical registers in CPUs.

BACKGROUND

Hardware processors include one or more central processing unit (CPU) which each may further include a number of physical registers for staging data between memory and functional units in CPUs. The CPU may be programmed with instructions and micro-operations that include logical registers for accessing these physical registers. Table 1 is an illustrative example of instructions of a store and load operation pair which includes manipulation of logical register RAX. A Register Alias Table (RAT) is commonly used to track the mapping between logical registers (such as RAX) and their corresponding physical register inside the CPU.

TABLE 1

RAX = first operation
...
Store [ADDRESS] ←RAX
...
RAX = Load [ADDRESS']
... second operation on RAX Different methods may be used to efficiently utilize these registers. U.S. patent application Ser. No. 12/978,513 ('513 Application) uses a Move Elimination technique that implements logical register to logical register copy operation as manipulations inside RAT. Namely, instead of executing a copy operation in the CPU (which creates a separate physical register with the same data content), both logical registers are simply mapped to the same physical register inside the RAT. The complexity is that when one of the logical registers is overwritten and thus disassociated with the physical register, that physical register cannot be freed until the other logical register mapping has also been overwritten. In the 513 Application, a Multiple Instance Table (MIT) is used to track all of the logical register references to a particular physical register.

Memory renaming is another technique that exploits register to register copy operations that occur through memory. In this approach, the logical register's value is stored to memory and then loaded back into another register. As shown in Table 2, Since RAX and RBX hold the same data value as a result of load operation, the physical register initially mapped to logical register RAX can effectively also be remapped to logical register RBX. This may improve performance because the consumers of RBX no longer need to wait for the store and load to be completed for dispatch to the execution. Instead, the execution can start as soon as RAX is written by the "first operation."

TABLE 2

RAX = first operation
...
Store [ADDRESS] ←RAX
... (no intervening write to [ADDRESS])
RBX = Load [ADDRESS]
... second operation on RBX In both the Move Elimination approach and the Memory Renaming approach, the shared physical registers cannot be freed until all correspondingly mapped logical registers have been overwritten by an allocation operation (or allocator), and there are no more micro-operations remaining in the out-of-order execution engine that can still reference those physical registers. It is desirable to allow RAX and RBX as shown in the example of Table 2 to share the same physical register, even after RAX is overwritten; note that the old version of RAX may be still in use by the out-of-order execution engine. Since the old value used by the out-of-order execution engine does not have a current (allocation time) logical register name, it is problematic to use logical register names for tracking physical register sharing.

DESCRIPTION OF THE FIGURES

Embodiments are illustrated by way of example and not limitation in the Figures of the accompanying drawings.

DETAILED DESCRIPTION

Figure 1:
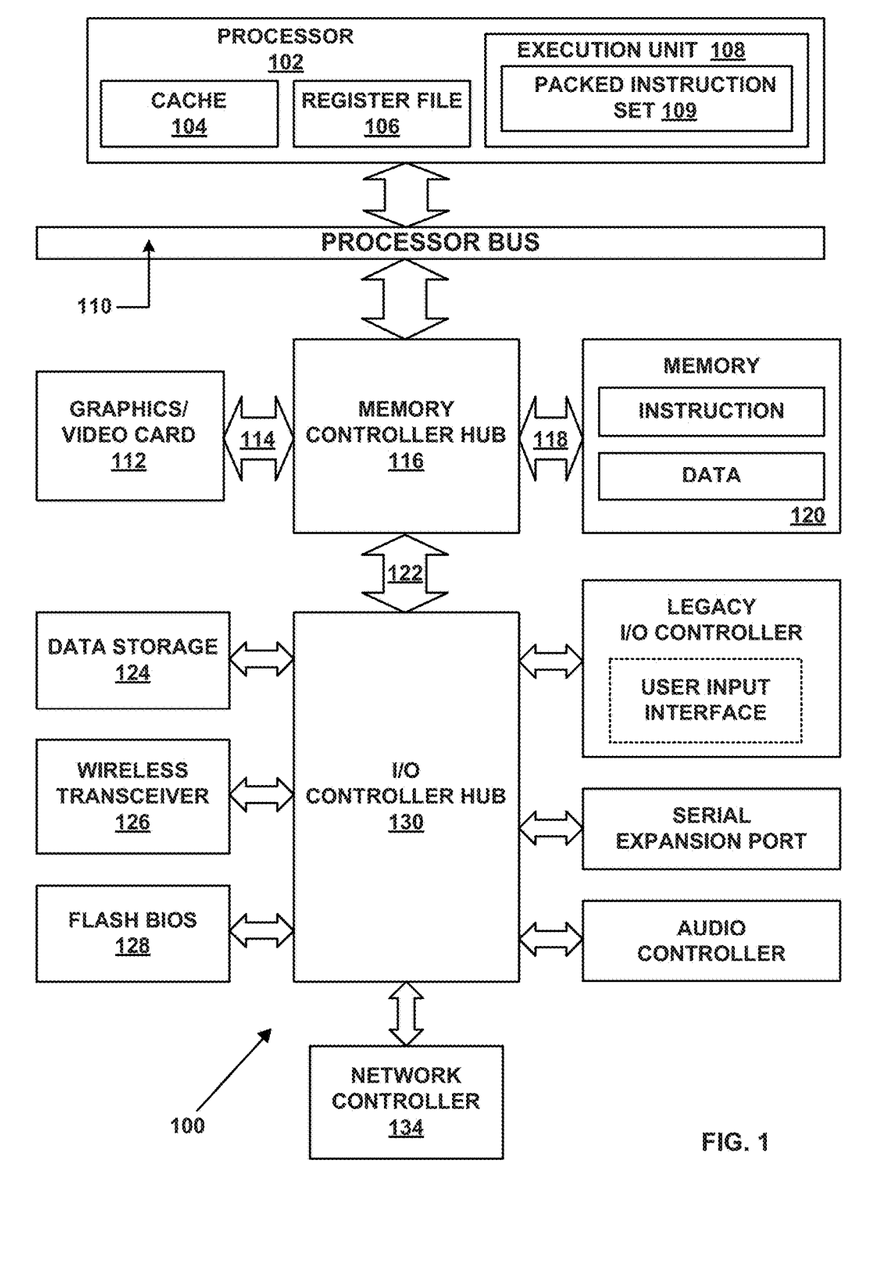
FIG. 1 is a block diagram of a system according to one embodiment of the present invention.

Embodiments of the present invention may include a computer system as shown in FIG. 1. The computer system 100 is formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Embodiments of the present invention may include a processor including a processing unit such as a central processing unit (CPU) that further includes a storage module having stored thereon a physical reference list for storing identifications of those physical registers that have been referenced by multiple logical registers, and a reclamation module for reclaiming physical registers to a free list based on a count of each of the physical registers on the physical reference list.

Embodiments of the present invention may include a method for managing references to physical registers. The method includes storing identifications of physical registers that have been referenced by logical registers in a physical reference list, and reclaiming physical registers to a free list based on a count of each of the physical registers on the physical reference list.

Figure 2:
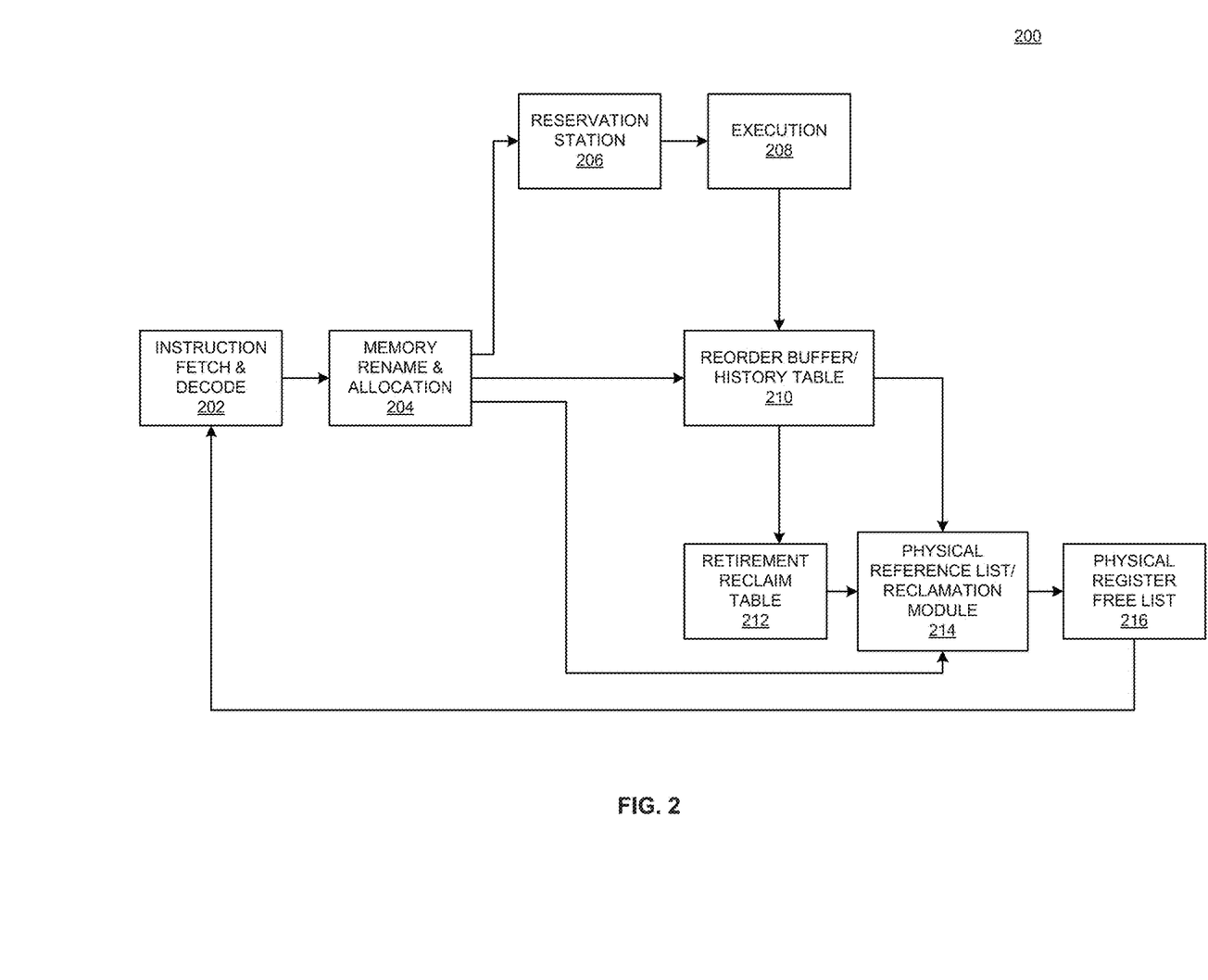
FIG. 2 is a block diagram of a system for memory renaming according to an embodiment of the present invention.

FIG. 2 is a block diagram of a system 200 for register renaming according to an embodiment of the present invention. The system 200 may include circuit logics inside a CPU that may be configured to perform register renaming functions. The system 200 as illustrated in FIG. 2 may include an instruction fetch and decode module 202, a rename and allocation module 204, a reservation station 206, an execution module 208, a reorder buffer and history buffer 210, a retirement reclaim table 212, a physical reference list 214, and a physical register free list 216.

The instruction fetch and decode module 202 may fetch instructions/micro-operations from an instruction cache and decode the instruction/micro-operation in preparation for execution. The decoded instructions/micro-operations may include Store operation and Load operation pairs (writer-reader sets) whose dependent operations may be sped up through memory renaming. In response to receiving a writer-reader set that can be optimized by memory renaming, the rename and allocation module 204 may initiate memory renaming. The rename and allocation module 204 may include a register alias table (RAT) (not shown) for tracking the mappings between logical registers and physical registers.

In response to the initiation of memory renaming by the memory rename and allocation module 204, the reservation station 206 is a logic circuit that may start to schedule independent operations out-of-order with respect to program (allocation) order. Consider the Load and Second Operation in Table 1. These instructions are not data dependent on the Store and First Operation, and can be executed in parallel. However, the Store instruction is data dependent on the First Operation, and so the reservation station 206 will execute those in order. Likewise, the Load and Second Operation must be executed in order. Referring to Table 2, the Load operation is data dependent on the Store operation because the Load is from the same address as the Store, thus the reservation station 206 would ensure all four instructions execute in order. In response to the initiation of memory renaming by the rename and allocation module, the reservation station 206 can execute the Second Operation out-of-order immediately after the first operation, thus bypassing memory, as well as execute the Store and Load operation (the latter converted to a load check instruction) in order following the First Operation. The execution module 208 is the logic circuit that executes the instructions. The reorder buffer and history table 210 may retain the execution results executed out-of-order, ensuring they are committed in order. In particular, the history buffer may store several mappings of logical registers to physical registers pertaining to several lifetimes of the same logical register that are alive in the out-of-order engine so that if a branch misprediction occurs, the correct mapping for the lifetime at the point of the misprediction may be restored so execution can resume on the correct path. The reorder buffer (ROB) is a structure that contains a sequential list of in-flight operations (either instructions or micro-operations) in program order. After an instruction has executed (this information may be acquired from the reorder buffer), and after all older instructions in program order have also committed, the next sequential instruction may be committed. All of the committed instructions may be indexed in the retirement reclaim table, which contains a list of the physical registers that are no longer needed once the committed instructions retire. For example, when an instruction that writes the RAX logical register retires, there can be no more instructions remaining in the machine that can refer to a previous version of RAX, and therefore the physical register that held that old value can be reclaimed to the physical register free list 216. However, through memory renaming, RBX might also be associated with the same physical register, such as at the end of the instruction sequence in Table 2. Since there may be multiple references to a physical register due to memory renaming, the physical reference list (PRL) is a data structure stored on a storage component that tracks the multiple references to the physical register. Once all references to a value have been overwritten as tracked by the PRL, an identification of the physical register may be placed on the physical register free list 216 and made available for instruction fetch and decode module 202.

One way to keep track of the mappings to physical registers is to use a counter to track the number of times a physical register is mapped to. However, this approach requires a counter for each physical register, which can be prohibitively expensive.

Instead of using dedicated counters, in one embodiment, PRL may include a list data structure which includes a list of entries. When a physical register is first allocated for an instruction/micro-operation result, the mapping to the physical register from a logical register is stored in the RAT. Subsequently, when a sharer (detected through either Move Elimination approach or Memory Renaming) allocates the same physical register, the RAT is updated with the mapping between the physical register and the sharer. Further, the reclamation module 214 may place the physical register identification of the shared physical register into a free entry in the PRL. In this way, the reclamation module may place any additional allocated sharers into free entries in the PRL. Thus, the PRL maintains N−1 entries of the physical register identifications if there are N sharers to the physical register. When a sharer to the physical register is overwritten and the reference to the physical register is no longer in the out-of-order execution engine, the reclamation module 214 may detect the reduction in sharers through an entry in the retirement reclaim table and may find a copy of the physical register identification in the PRL and remove the entry containing the physical register identification from the PRL. When the last reference to the physical register is removed from the PRL, only one reference to the physical register exists in the out-of-order execution engine. When the last sharer to the physical register is overwritten and no longer in the out-of-order execution engine, the physical register identification is not in the PRL, and the physical register is reclaimed to the free list. In this way, the last sharer may be identified if it cannot be found in the PRL.

In one embodiment, the processor may be capable of executing multiple instructions/micro-operations in parallel. For example, in one embodiment, the processor may be four wide retirement machine in which four sharers may exit the out-of-order execution engine simultaneously. Therefore, the PRL/reclamation module 214 should be able to handle various scenarios such as up to four removals of the same physical register identification number in a same clock cycle; three removals of the same physical register identification number and detection that a fourth copy is not present; up to four removals of different physical register identification numbers, etc. In addition, the PRL/reclamation module 214 should be able to handle allocations (or additions) of new sharers during each clock cycle. The allocated new sharers may be four of the same physical registers, or different physical registers, or various combination of the same and different registers, including the addition of new physical register entries that match the same physical register stored in other entries which are being removed in the same clock cycle, subject to a boundary case described later.

In one embodiment, the reclamation module 214 may implement the PRL as a content-addressable memory (CAM) structure that may be configured to, when supplied with a data word, search its entire memory to determine whether there is a match to the data word. If a match is found, the CAM may return a list of addresses at which the data word is found. As to the PRL that is implemented as a CAM structure, if a physical register identification number is supplied to the CAM, the addresses of the entries in PRL may be returned based on which the entries may be invalidated. Additionally, if the CAM cannot find any matching for a supplied data word, the CAM may indicate that there is no matching. In one embodiment, the CAM may return a NULL to indicate that there is no match in the PRL. To handle four micro-operations per cycle, the CAM is configured with a carry chain or priority mechanism so that each search of a particular physical register identification number finds at most a single PRL entry that is also unique from any other searches of the same physical register identification number in that same cycle.

Figure 3:
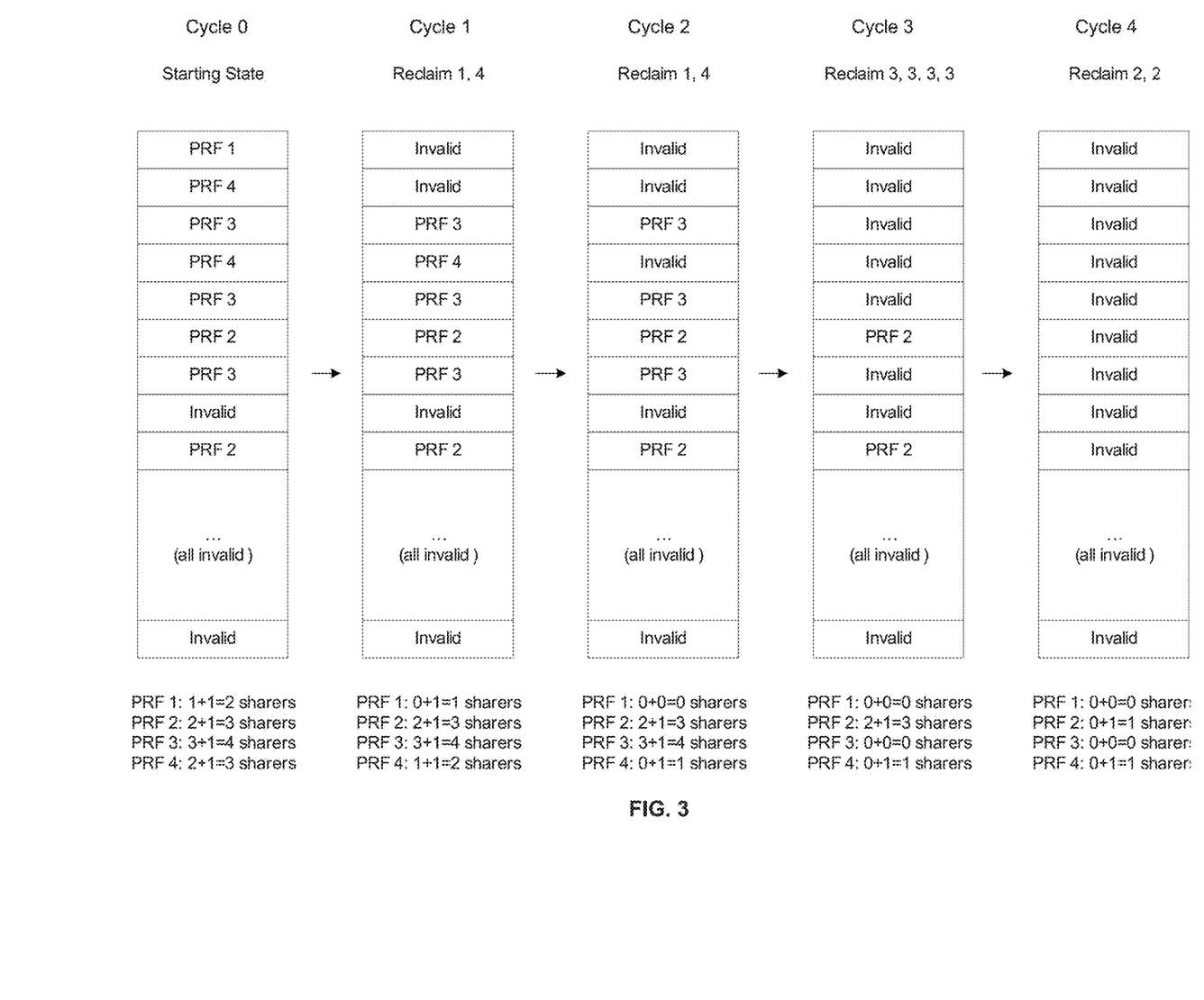
FIG. 3 illustrates removal of items in a physical reference list (PRL) according to an embodiment of the present invention.

FIG. 3 illustrates an example of a PRL whose entries are removed based on overwriting logical registers according an embodiment of the present invention. At a starting state (or clock cycle 0), the PRL may include a plurality of entries having stored thereon physical register identification numbers indicating those physical registers that have been mapped to a sharer. In this example, physical registers 1 to 4 have 2, 3, 4, 3, respective, sharers. Recall that the PRL contains N−1 entries for each physical register that is shared, and thus contains 1, 2, 3, 2 entries, respectively. At clock cycle 1, the out-of-order execution engine may overwrite logical registers that are mapped to physical registers 1 and 4. Upon receiving physical register identifications 1 and 4, the PRL may return addresses for their entries (list positions 1 and 2) based on which these entries are invalidated. After clock cycle 1, physical registers 1 to 4 have 1, 3, 4, 2, respective sharers, and thus 0, 2, 3, 1 respective entries contained in the PRL. At clock cycle 2, the out-of-order execution engine may again overwrite logical registers that are mapped to physical registers 1 and 4. Since no physical register 1 is found in the PRL, physical register 1 had only one sharer and is reclaimed to the free list. After clock cycle 2, physical registers 2 to 4 have 3, 4, 1 respective sharers. Subsequently, at clock cycle 3, the out-of-order execution engine may overwrite logical registers that are mapped to physical register 3 four times. Since the PRL indicates that physical register 3 has only four sharers (appearing three times in PRL), all entries including physical register 3 may be invalidated and physical register 3 may be reclaimed to the free list. After clock cycle 3, physical registers 2 and 4 have respective 3 and 1 sharers (2 and 0 entries contained in the PRL, respectively). Subsequently, at clock cycle 4, the out-of-order execution engine may overwrite logical registers that are mapped to physical register 2 twice. The two entries including physical register 2 are invalidated. After clock cycle 4, physical registers 2 and 4 have respective one sharer.

Figure 4:
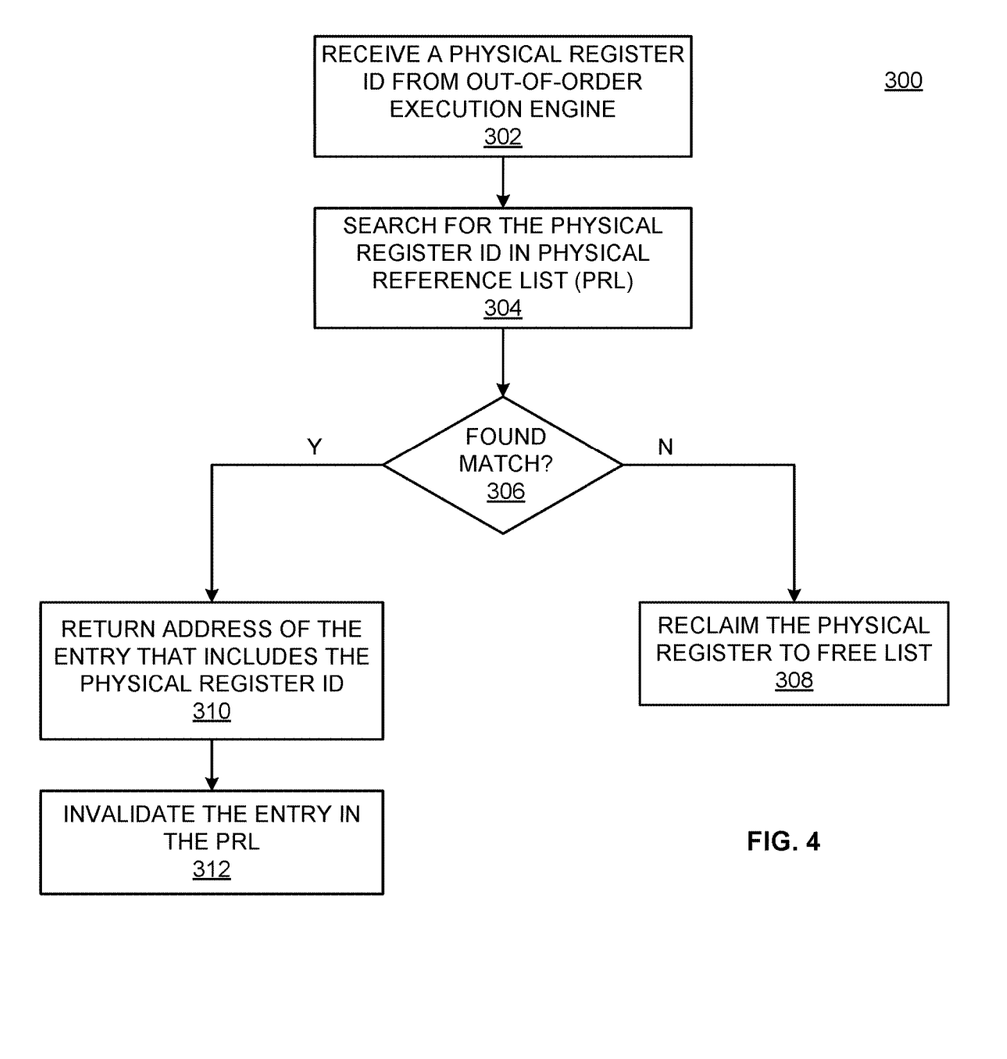
FIG. 4 illustrates a process of managing a physical reference list (PRL) according to an embodiment of the present invention.

FIG. 4 illustrates a process 300 of managing a physical reference list (PRL) according to an embodiment of the present invention. At 302, CAM having stored thereon the PRL may receive a physical register identification number from the out-of-order execution engine indicating that the logical register mapped to the physical register has been overwritten. At 304, a search for the physical register identification number may be performed on the PRL. When the PRL stored in a CAM structure, the search may be performed by hardware automatically. At 306, the search result may indicate whether there is a hit (or match) in the PRL. If there is no match (e.g., by returning a NULL)—indicating there exists only one sharer to the physical register, at 308, the physical register may be reclaimed to the free list because the last reference to the physical register has just been removed. However, if there is a match, at 310, the CAM may return the address of the entry that includes the physical register identification number. Based on the returned address, at 312, the entry that includes the physical register identification may be invalidated.

FIG. 4 illustrates an example of a single entry scenario. When the out-of-order execution engine is capable of executing multiple micro-operations, multiple physical register identification numbers may be presented to the PRL. If there is a single match per physical register identification number, each physical register identification number may be processed using the method illustrated in FIG. 4. If there are multiple matches for an ID, those matches may be prioritized using a find first-N search algorithm (where N is the maximum number of identical physical register identification numbers that can be presented simultaneously). The search results (i.e., up to N matches) may be used to invalidate entries in the PRL and possibly free a physical register to the free list if a match is not found.

Figure 5:
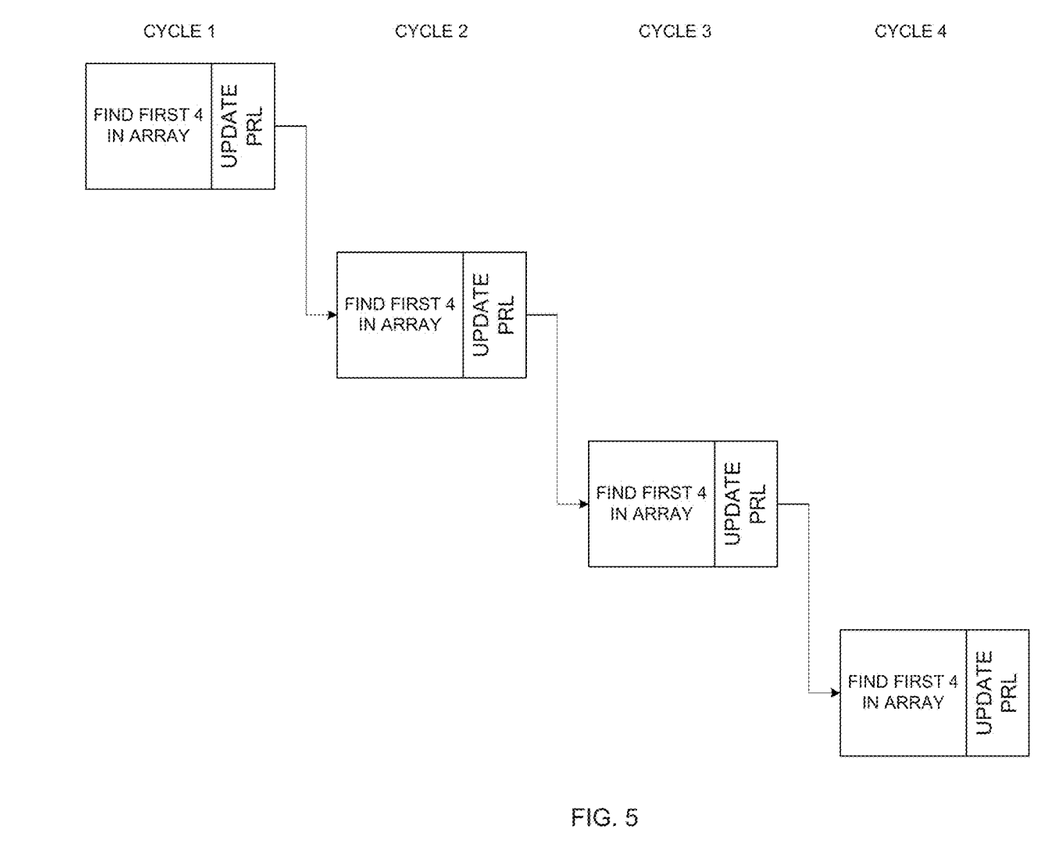
FIG. 5 illustrates a one-clock-cycle approach to managing a PRL using CAM-based match and sort according to an embodiment of the present invention.

Due to the nature of CAM, the results of a CAM match in one clock cycle need to be fed back into the CAMs in the following clock cycle, in case the reclamation pipe attempts to handle the same physical register identification number in back-to-back clock cycles. This limitation of CAM may create a single cycle timing loop. FIG. 5 illustrates a timeline of CAM-based match. As shown in FIG. 5, each clock cycle, the CAM handles a fixed number (here 4) of physical register identification numbers. However, the logic required to complete the CAM result prioritization and incorporate the result back into the next cycle's CAM result may not fit into a single clock cycle.

Figure 6:
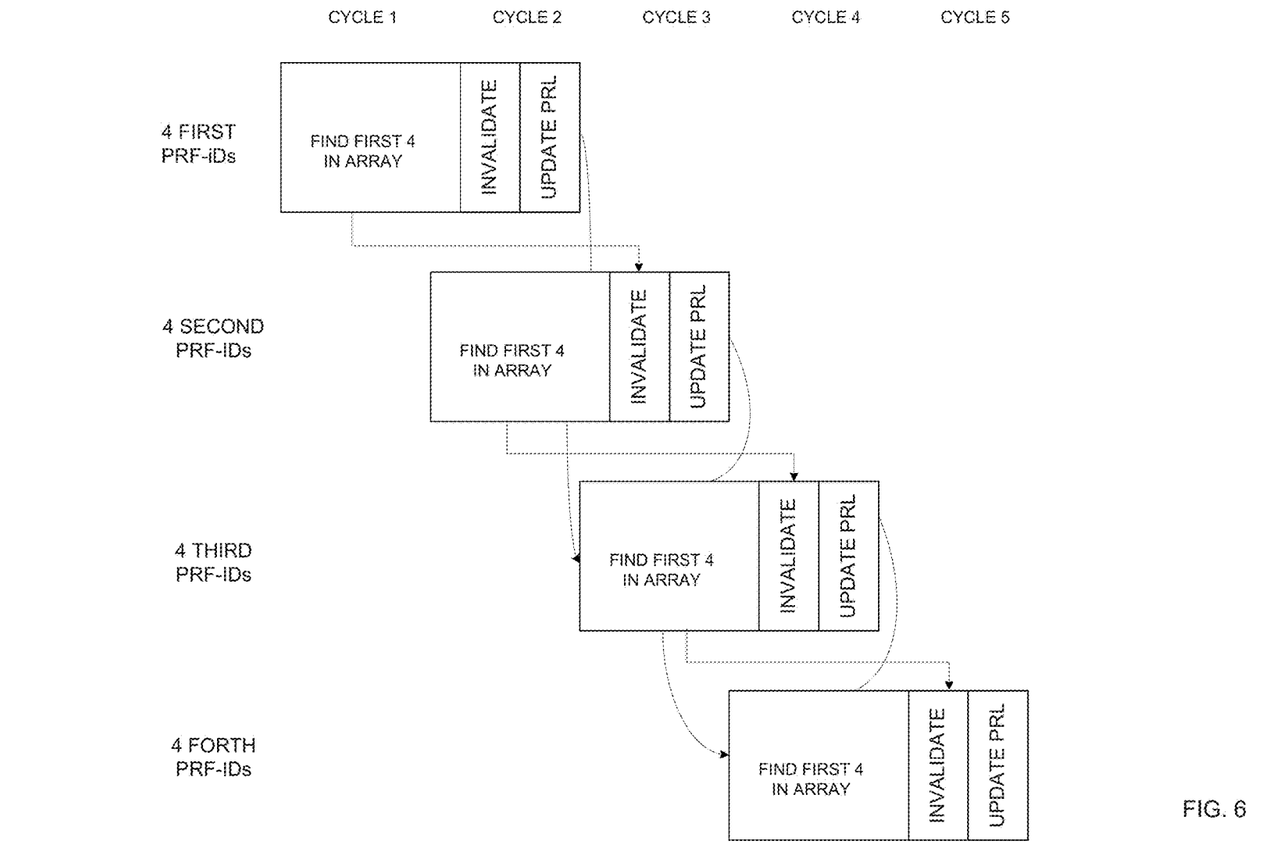
FIG. 6 illustrates a two-clock-cycle approach to managing a PRL according to an embodiment of the present invention.

To solve this problem, the loop performing the prioritizing CAM results and clearing the PRL is increased to two clock cycles. In the first cycle, the reclamation module 214 may search for entries that include physical registers matching logical registers overwritten by the out-of-order execution engine. In the first cycle, the reclamation module 214 may not look into the matching results of the previous block of physical register identification numbers obtained in the previous clock cycles. In the second clock cycle subsequent to the first clock cycle, prioritized hits (or matches) are invalidated (or masked off) based on the results of the previous clock cycle. FIG. 6 illustrates a two-clock-cycle approach to managing a PRL according to an embodiment of the present invention. As shown in FIG. 6, the first set of four physical register identifications are processed in clock cycles 1 and 2; the second set of four are processed in clock cycles 2 and 3; the third set of four are processed in clock cycles 3 and 4; and the forth set of four are processed in clock cycles 4 and 5. In this way, the search for matches and prioritization may fit into clock cycles more efficiently.

A potential risk for the two-clock-cycle approach is that since the invalidation occurs in the second clock cycle, a hit may turn into a miss if the entry was also a hit and selected during the previous clock cycle. To ensure that a real PRL hit is not erroneously turned into a miss (in back-to-back clock cycles) when the physical register still has a valid entry in the PRL, the pipeline may switch the order of the prioritization after each clock cycle. Specifically, in one clock cycle, the circuit logic may search from entries 0 to N, where N is the highest entry number, and in the following clock cycle, search from N to 0. Namely, the search is alternatively from top to bottom and from bottom to top in consecutive clock cycles. This ensures that results from back-to-back cycles can only overlap (and update a hit to a miss) at most one PRL entry per physical register identification number in each cycle. This is because for M sharers, there can only be M overwrites from the retirement reclaim table, and thus there are exactly M−1 entries in the PRL.

Figure 7:
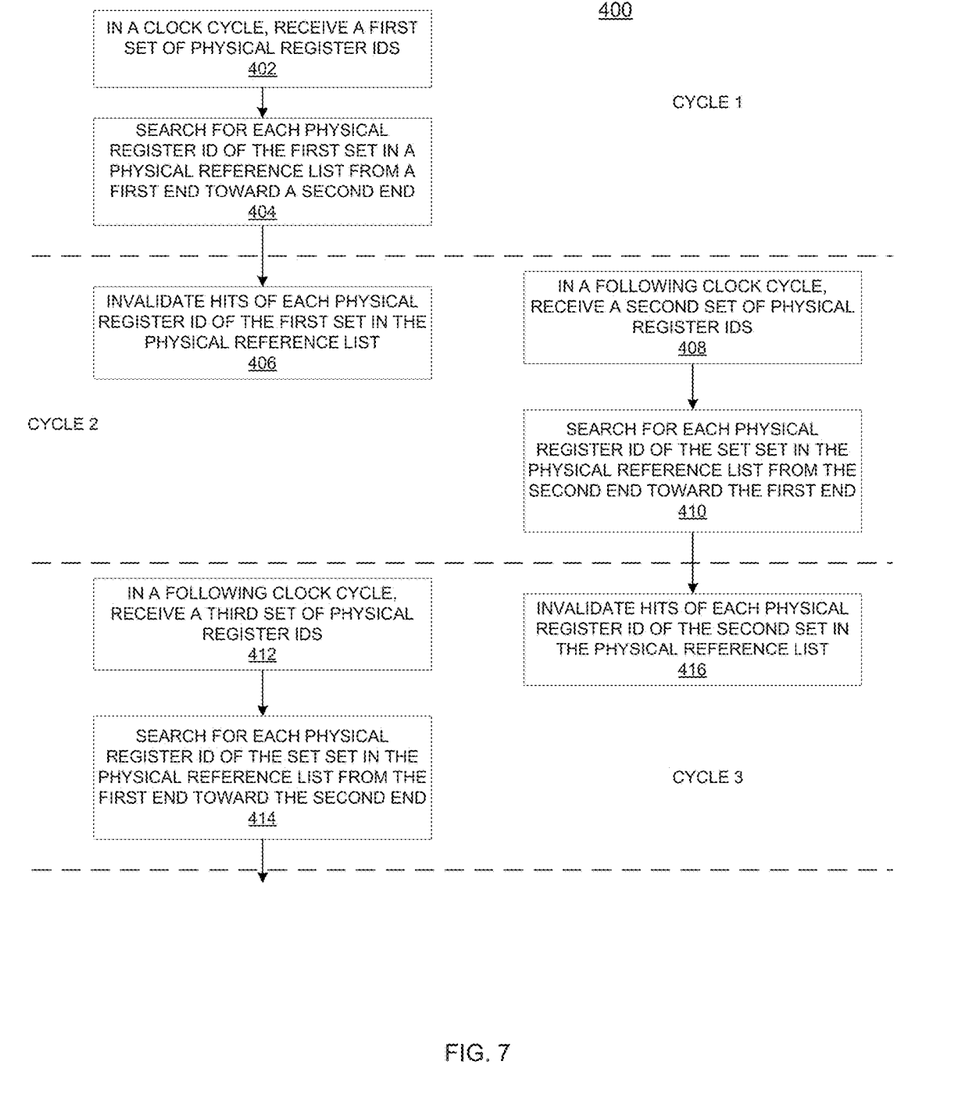
FIG. 7 illustrates a process that uses the two-clock-cycle approach to manage PRL according to an embodiment of the present invention.

FIG. 7 illustrates a process that uses the two-clock-cycle approach to manage PRL according to an embodiment of the present invention. As shown in FIG. 7, in a first clock cycle (CYCLE 1), at 402, the reclamation module 214 may receive a first set of physical register identification numbers from the out-of-order execution engine, indicating those physical registers that are have lost references to a logical register. At 404, still in the first clock cycle, the reclamation module 214 may search for each physical register identification number of the first set in the PRL from a first end to a second end (such as from top to bottom). The search results may be addresses for entries that contain the physical register identification numbers in the first set. In a following clock cycle (CYCLE 2), at 406, the reclamation module 214 may invalidate PRL entries contained in the search result from CYCLE 1. In the same clock cycle (CYCLE 2), at 408, the reclamation module 214 may simultaneously receive a second set of physical register identification numbers from the out-of-order execution engine. While still in CYCLE 2, at 410, the reclamation module 214 may search for each physical register identification number of the second set in the PRL from the second end to the first end (such as from bottom to top). Thus, the search direction alternates between consecutive clock cycles. According to one embodiment, search process 410 may not yet comprehend the invalidations performed by invalidation process 406. Similarly, the search results may be addresses for entries that contain the physical register identification numbers in the second set. In a following clock cycle (CYCLE 3), at 416, the reclamation module 214 may invalidate PRL entries contained in the search result from CYCLE 2. In the same clock cycle (CYCLE 3), at 412, the reclamation module 214 may simultaneously receive a third set of physical register identification numbers from the out-of-order execution engine. While still in CYCLE 3, at 414, the reclamation module 214 may search for each physical register identification number of the third set in the PRL from the first end to the second end. The process may be similarly repeated for each subsequent clock cycle.

Figure 8:
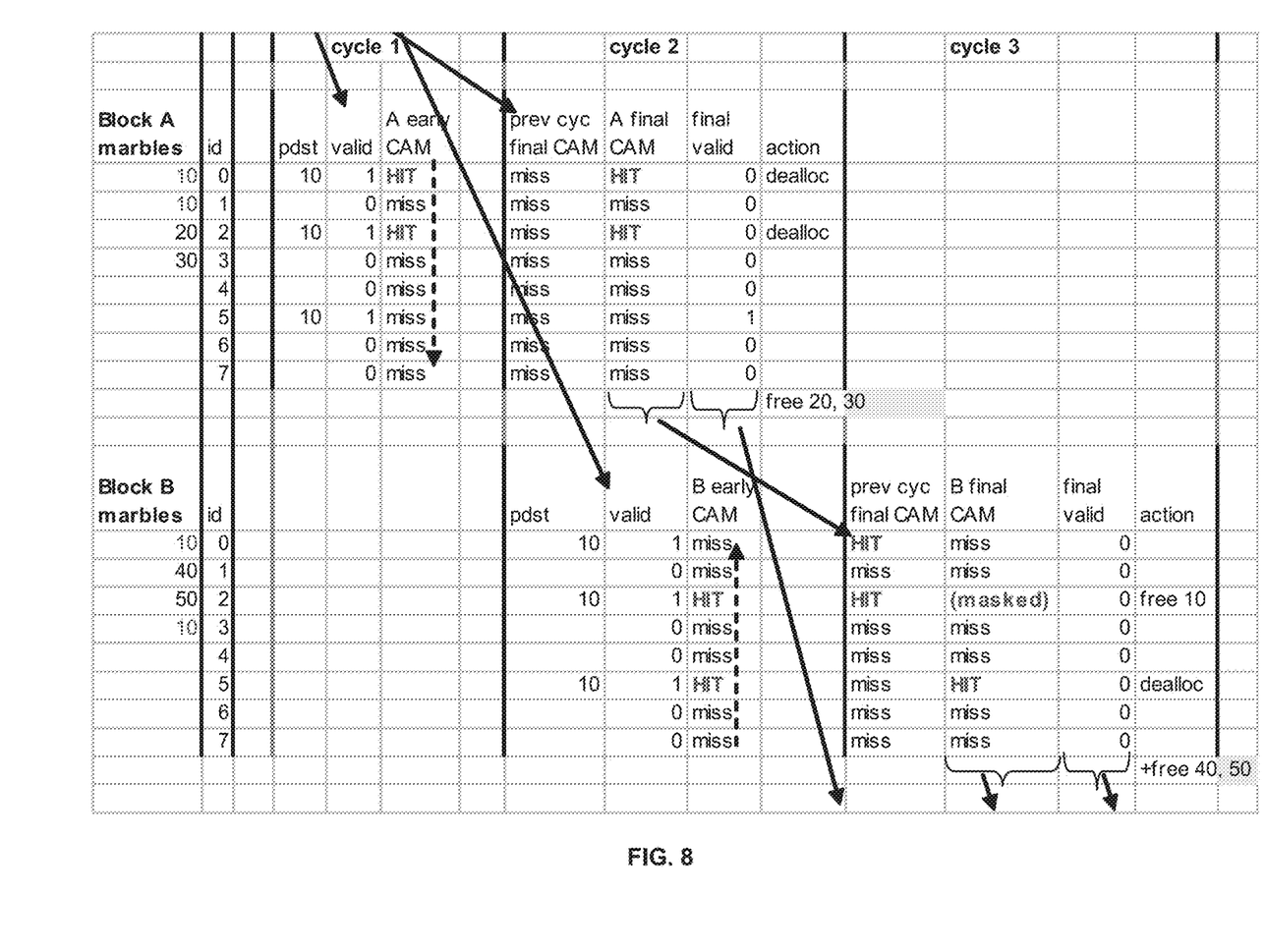
FIG. 8 illustrates a specific example of managing PRL according to an embodiment of the present invention.

FIG. 8 illustrates a specific embodiment according to an embodiment of the present invention. In this example, the first set of physical register identifications (Block A) received from the out-of-order includes physical registers (10, 10, 20, 30). At clock cycle 1, the reclamation module 214 may search a PRL from top to bottom. The PRL includes entries 0 to 7 in which entries 0, 2, and 5 include physical register identification 10. During clock cycle 1, hits are found for entries 0 and 2 due to the top to bottom search. In the following clock cycle 2, entries 0 and 2 are invalidated by dealloc operations. At clock cycle 2, the reclamation module 214 may receive a second set of physical registers (Block B) including physical registers (10, 40, 50, 10). During the same clock cycle 2, the reclamation module 214 may search from the bottom to top. Since the entries 0 and 2 have yet invalidated, the search may find hits at entries 5 and 2 for physical register 10. In the following clock cycle 3, the reclamation module 214 already finishes invalidating entries 0 and 2. Therefore, when the reclamation module 214 tries to invalidate entry 2, it may find that entry 2 is already masked. This indicates that there is no more entry to invalidate and that the physical register 10 can be reclaimed to the free list. As shown in FIG. 8, Blocks A and B may include physical registers 20, 30, 40, and 50 which do not have any hits in the search. These physical registers do not have any sharers and are reclaimed to the free list.

When new mappings are created between physical registers and logical registers, these physical register identification numbers may be written into free entries in the PRL. However, for the two-clock-cycle approach as shown in FIG. 7, the write to the PRL (that is, the addition of new sharers) may not occur within one clock cycle of the last remaining reference being looked up in the PRL. This eliminates the potential risk of a physical register being added in the last clock cycle and is not searched for before the physical register is reclaimed to the free list.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor, comprising:
internal cache memory;
a processing unit including a storage module having stored thereon a physical reference list having a plurality of entries for storing identifications of physical registers referenced by multiple logical registers, the processing unit being configured to:
perform a first search for matches for a first set of identifications of physical registers in the physical reference list in a first clock cycle to generate a first ordered list of matches,
perform a second search for matches for a second set of identifications of physical registers in the physical reference list in a second clock cycle to generate a second ordered list of matches, and
turn a match in the second ordered list into a no match based on a determination that a match in the first ordered list and the match in the second ordered list correspond to an identical entry of the physical reference list.

2. The processor of claim 1, wherein the processing unit is configured to perform the first search from a first end to a second end of the physical reference list.

3. The processor of claim 2, for each of the identifications in the first set, in the second clock cycle, the processing unit is further configured to:
reclaim a physical register corresponding to the identification to a free list based on a corresponding no match, and
invalidate an entry of the physical reference list that contains the identification based on a corresponding match.

4. The processor of claim 2, wherein the processing unit is configured to perform the second search from the second end to the first end of the physical reference list.

5. The processor of claim 4, for each of the identifications in the second set, in a third clock cycle, the processing unit is further configured to:
reclaim a physical register corresponding to the identification to a free list based on a corresponding no match, and
invalidate an entry of the physical reference list that contains the identification based on a corresponding match.

6. The processor of claim 1, wherein the processing unit includes an out-of-order execution engine for executing instructions.

7. The processor of claim 6, wherein an allocation of an instruction creates a logical reference between a physical register and a logical register.

8. The processor of claim 6, wherein an execution of an instruction eliminates a logical reference between a physical register and a logical register.

9. The processor of claim 6, wherein the out-of-order execution engine outputs up to N identifications of physical registers for each of a plurality of dock cycles, indicating N physical registers which are no longer referenced and whose corresponding logical registers have been overwritten.

10. The processor of claim 9, wherein N is 4.

11. The processor of claim 6, wherein the out-of-order execution engine outputs up to M identifications of physical registers for each of a plurality of clock cycles, indicating M newly created logical references to physical registers, M being an integer.

12. A method, comprising:
storing identifications of physical registers, which are referenced by multiple logical registers, in a physical reference list in a storage module;
performing, by a processing unit, a first search for matches for a first set of identifications of physical registers in the physical reference list in a first clock cycle to generate a first ordered list of matches;
performing, by a processing unit, a second search for matches for a second set of identifications of physical registers in the physical reference list in a second clock cycle to generate a second ordered list of matches; and
turning a match in the second ordered list into a no match based on a determination that a match in the first ordered list and the match in the second ordered list correspond to an identical entry of the physical reference list.

13. The method of claim 12, further comprising performing the first search from a first end to a second end of the physical reference list.

14. The method of claim 13, for each of the identifications in the first set, further comprising:
   reclaiming a physical register corresponding to the identification to a free list based on a corresponding no match; and
   invalidating an entry of the physical reference list that contains the identification based on a corresponding match.

15. The method of claim 13, further comprising performing the second search from the second end to the first end of the physical reference list.

16. The method of claim 15, for each of the identifications in the second set, in a third clock cycle, further comprising:
   reclaiming a physical register corresponding to the identification to a free list based on a corresponding no match; and
   invalidating an entry of the physical reference list that contains the identification based on a corresponding match.

17. The method of claim 12, further comprising executing instructions on an out-of-order execution engine.

18. The method of claim 17, further comprising creating a logical reference between a physical register and a logical register by allocating an instruction.

19. The method of claim 17, further comprising eliminating a logical reference between a physical register and a logical register by executing an instruction.

20. The method of claim 17, further comprising outputting, by the out-of-order execution engine, up to N identifications of physical registers for each of a plurality of clock cycles, indicating N physical registers which are no longer referenced and whose corresponding logical registers have been overwritten.

21. The method of claim 20, wherein N is 4.

22. The method of claim 17, further comprising outputting, by the out-of-order execution engine, up to M identifications of physical registers for each of a plurality of clock cycles, indicating M newly created logical references to physical registers, M being an integer.

* * * * *